Oct. 11, 1927.
E. G. TODT
1,644,861
RAILWAY TANK CAR BOTTOM OUTLET
Filed May 28, 1924
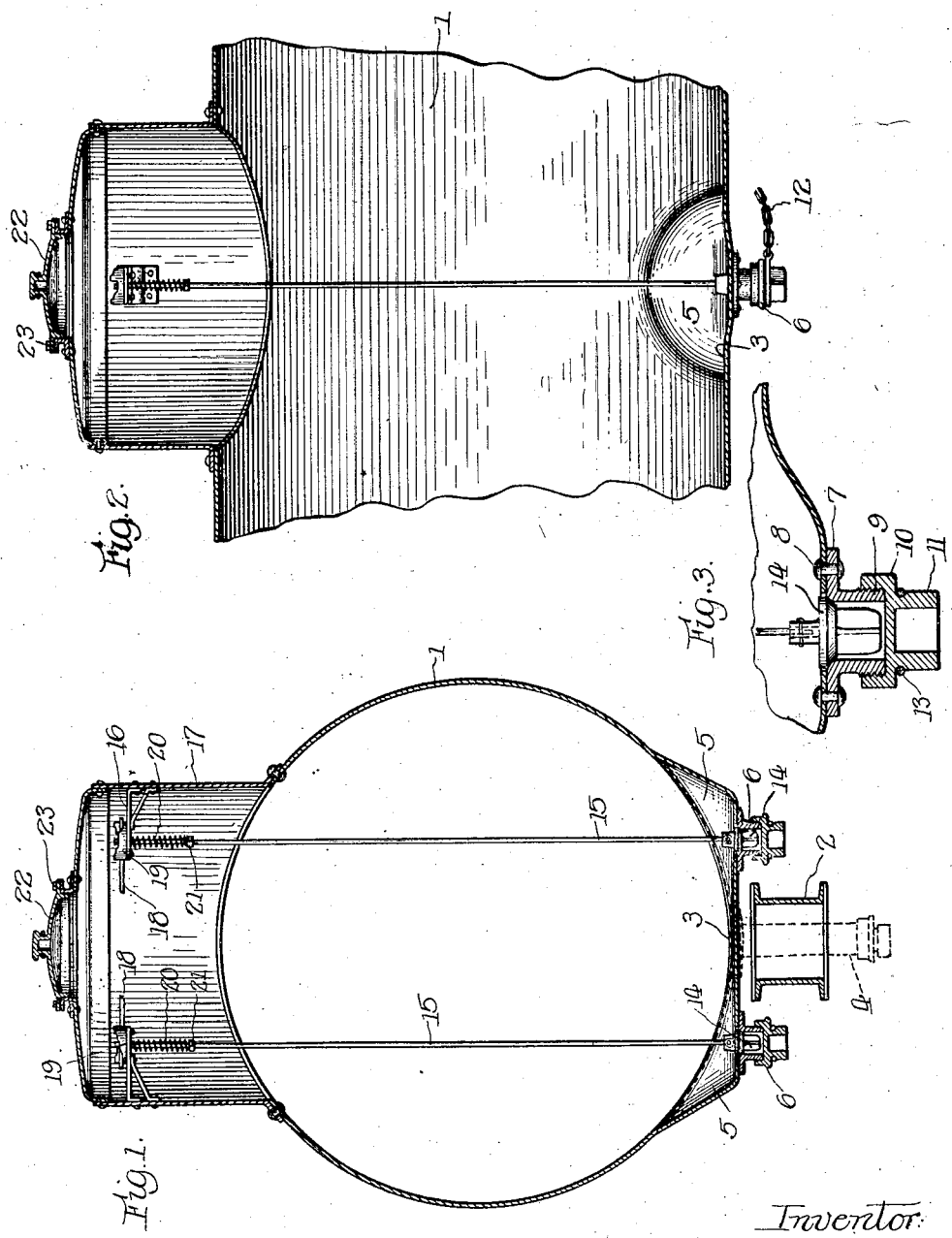
Inventor:
Edward G. Todt, Patented Oct. 11, 1927.

1,644,861

UNITED STATES PATENT OFFICE.

EDWARD GEORGE TODT, OF CHICAGO, ILLINOIS.

RAILWAY-TANK-CAR BOTTOM OUTLET.

Application filed May 28, 1924. Serial No. 716,330.

My invention relates to tank cars which are used for shipping petroleum and other products in the railway service and the object of my invention is to provide an outlet that will be free from objections heretofore encountered in the service and will have the merit of a safety appliance in the manner of preventing accidental discharge and accidental breakage of the outlet parts, thus insuring the safety of the cargo.

Reference will be had to the accompanying drawing, in which Figure 1 is a transverse sectional view through the central or dome portion of a standard tank car. Figure 2 is a longitudinal section showing the same portions as indicated in Figure 1. Figure 3 is an enlarged sectional view of the outlet valve. In the drawing 1 indicates the ordinary drum or body portion of a tank car and 2 indicates the center sill construction as now commonly used in tank cars.

The outlet valve heretofore has been located in the region of the bottom center line of the tank, indicated by 3, and an outlet valve indicated by 4 in dotted line shows the ordinary common construction heretofore used. The location of the valve in the bottom and as it were in the center of the cylinder of the tank is for the purpose of draining out completely the tank when the load is discharged, and as these tanks heretofore have been cylindrical in shape the outlet as located at the point 3 and indicated by 4 is the natural outlet as heretofore used.

The center sill construction has become as it were standard not only for tank cars but for all other freight cars and in many instances passenger cars as well.

In the ordinary freight service the freight cars of today are subjected to tremendous impact shocks in the switching operation on what are known as hump tracks wherein the cars are run down inclines and allowed to bump into the accumulated cars on any given siding and the impact lessened only by the control of the brakeman on individual cars. These brakes do not always work successfully and hence there are frequent accidents in switching on the hump track method and much damage to cars and cargo is thus met with.

Long and heavy trains are common in the freight service and as all freight cars now are provided with air brakes it frequently occurs that in emergency stops tremendous impact shocks are met with between the different cars of the train. This is particularly true of the tank cars themselves owing to the fact that their cargo acts as an entire unit and when an impact occurs it becomes as one solid body because the cars are usually filled to their capacity all excepting the dome. As a result of this when accidents of impact occur any loaded tank cars in the train are more likely to be damaged and dislodged from their under frames than are the cars of other character.

This accidental damage to tank cars is also more likely to occur in times of a wreck owing to this unitary character of the load and as it were a solid unitary mass acting to tear away from its fastenings.

Experience has proven that when an outlet for a tank car is located at the bottom as indicated by 4 in dotted lines, any dislodgement or distortion of the tank car from its framing serves to break loose the outlet valve from the body of the tank and allowing the oil to escape and in derailments, collisions and accidents of different kinds the contents of the car leaks out and ignition takes place because of sparks or other causes of fire, then the oil becomes a serious menace to the balance of the train. Any feature of safety that will guard against accidents of this sort would save very large sums of money on the aggregate of the business at large of this kind.

With my invention I emboss the center plate of the tank car body downward into the portions indicated by 5 on each side of the tank body and instead of one center outlet valve I provide two outlet valves, one of them being on each side of the center sill as indicated by 6.

The standard tank car of the present time is made with a single unitary sheet of metal running the length of the tank and covering the bottom portion of the tank for the purpose of avoiding the liability of leaks that may be due to splices and rivet holes of various kinds wherein the tank body is made of separate sheets and the rivets located on the lower bottom of the tank. By embossing the sheet as I have done I avoid the necessity of any rivet holes or splice pieces under the bottom of the tank and thus do not damage or increase the risk because of my embossed portions 5 as indicated.

The valve stem as heretofore used, as indicated by 4 and shown in dotted lines, has usually been made of a casting and necessarily so because of its character, but by reason of the fact that I make my outlet valves short and compact, as indicated by the position 6, I may make the outlet valve portions of drop forgings and thus insure against accidental damage because of the short and compact nature of my outlet valve parts. In Figure 3, 7 indicates the drop forged nipple which is secured to the bottom of the tank by the rivets 8 and on this nipple is a threaded portion 9 on to which a threaded portion 10 of a cap 11 is screwed. This cap 11 is a simple construction and is also made of a drop forging. A chain 12 is secured by a ring 13 around this cap portion 11 for the purpose of retaining the cap in association with the car when the contents are being withdrawn from the car.

Each of the ordinary plugs or valves 14 is connected by a suitable rod 15 to the ordinary system of valve construction heretofore used, which consists of a bracket 16 located within the dome 17 through which the rod 15 passes. On to this rod 15 there is a hand lever 18 which is adapted to ride on a cam block 19 on the bracket 16. A spring 20 pushes against the bracket 16 and against a nut or shoulder 21 on the rod 15 to push the valve block 14 always down home into its seat in the nipple piece 7 of my valve.

In order to provide an outlet for the tank on each side of the center sill 2 I duplicate my valve, putting one on each side as indicated in Figure 1.

In discharging the contents of the tank car the amount of opening that the valve 14 is given depends on the character of the cargo. For light oil such as gasoline and kerosene the opening will be slight and the lever 18 will be moved only part way around the cam block 19, thus lifting or compressing the spring but slightly in pushing the block 14 up out of its seat, but for heavy fuel oils it is necessary at times to lift the entire plug 14, giving all the aperture possible for the escape of the contents of the car.

The top of the dome of the car as shown in the drawings is substantially as what is now used in general service, having as it were a manhole lid 22 secured by bolts 23 to a flanged body on top of the dome. It is always intended to open the dome at the top in order to get at the valves which allows the cargo to be discharged. This is a safety measure against robbery and tampering with the valves by trespassers upon railroad property.

In any cargo of oils and particularly the heavier grades of oils there is always a certain percentage of water entrained with the oils and as these cargoes are frequently allowed to stand for a considerable length of time and also considerable time is used in transit it is common for the water to segregate at the bottom of the tank as actual water and in freezing weather this water freezes while the balance of the cargo may not freeze and it becomes a menace to any cavity or valve mechanism constructed in a manner that might be damaged by a solidifying of the water contents that might segregate at the bottom of the tank.

The usual type of central outlets such as I have described have been liable to be damaged by the freezing of this water content, but with my construction the embossed portions 5 are so shaped that even if the water were to segregate in them and freeze in a solid mass the expansion of the ice portion would result in lifting it free from the tank body without rupturing or damaging any portion due to my embossed portions 5.

Any water that might segregate and freeze in the valve or nipple portion of my outlet would be so small and so short that the expansion of this ice portion would float upward and lift the valve block 14 sufficiently to accommodate this expansion without damage to any of the parts, but with a long valve stem or block as indicated by the dotted line 4 there might accumulate a sufficient amount of water as to rupture this long valve stem, a feature of accident not likely to occur with my construction.

What I claim is:

1. In a tank car tank of cylindrical character having a portion of the body embossed downward, thereby forming a sump into which the body of the car may drain and this recessed portion located at one side of the center sill member of the car in combination with an outlet valve located in the recessed portion.

2. In a tank car construction having a center sill for the car body and a cylindrical tank for carrying the cargo and said cylindrical tank having two embossed portions, one on each side of the center sill, embossed downward in a manner to furnish a sump adapted to drain the balance of the car into the sump in combination with a set of valves, one on each side of the center sill member and adapted to act as the outlet valves for the tank of the car.

3. A bottom discharging cylindrical car tank having portions of its cylindrical wall outwardly embossed to form draining sumps extending laterally beyond the center sill and a valve carrying discharge nozzle in each of said sumps.

4. In a tank car, means for preventing the breakage of a discharge nozzle consisting in providing a tank with a draining sump at one side of a center sill of the car and projecting downwardly from the general outline of said tank, a discharge nozzle in said sump and a spring-pressed reciprocating closing valve normally closing said sump.

5. A railway car tank means for preventing the breakage of a discharge nozzle consisting in providing a lateral draining sump on each side formed from its metal shell and projecting downwardly, a valve carrying discharge nozzle in each of said sumps, and a closure cap normally forming a secondary seal for each valve.

Signed at Chicago, in the county of Cook and State of Illinois, this 24th day of May, 1924.

EDWARD GEORGE TODT.